(12) United States Patent
Jubran

(10) Patent No.: US 7,549,144 B2
(45) Date of Patent: Jun. 16, 2009

(54) CUSTOM API MODELING FOR SOURCE CODE STATIC ANALYSIS SIMULATOR

(75) Inventor: Marwan E. Jubran, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 434 days.

(21) Appl. No.: 11/063,303

(22) Filed: Feb. 22, 2005

(65) Prior Publication Data

US 2006/0190923 A1    Aug. 24, 2006

(51) Int. Cl.
*G06F 9/45* (2006.01)
(52) U.S. Cl. .................. 717/143; 717/124; 717/131
(58) Field of Classification Search .......... 717/139–161, 717/143, 124–135
See application file for complete search history.

(56) References Cited

U.S. PATENT DOCUMENTS

| | | | | |
|---|---|---|---|---|
| 5,283,856 A * | 2/1994 | Gross et al. | .................. | 706/47 |
| 5,692,122 A * | 11/1997 | Bird | .................. | 714/38 |
| 6,085,029 A * | 7/2000 | Kolawa et al. | .................. | 714/38 |
| 6,154,876 A * | 11/2000 | Haley et al. | .................. | 717/133 |
| 6,289,502 B1 * | 9/2001 | Garland et al. | .................. | 717/104 |
| 6,523,169 B1 * | 2/2003 | Glunz | .................. | 717/124 |
| 6,880,153 B1 * | 4/2005 | Thompson et al. | .................. | 717/151 |
| 6,883,166 B1 * | 4/2005 | Thompson | .................. | 717/161 |
| 6,993,751 B2 * | 1/2006 | Bhansali et al. | .................. | 717/137 |
| 2006/0026570 A1 * | 2/2006 | Chan et al. | .................. | 717/127 |
| 2007/0157182 A1 * | 7/2007 | Zatloukal et al. | .................. | 717/140 |

OTHER PUBLICATIONS

Guy Lewis Steele, Jr.; Debunking the "expensive procedure call" myth or, procedure call implementations considered harmful or, LAMBDA: The Ultimate GOTO; 1977; ACM; pp. 153-162.*
Kim, K.H.; APIs for real-time distributed object programming; 2000, IEEE, vol. 33; pp. 72-80.*

* cited by examiner

*Primary Examiner*—Wei Y Zhen
*Assistant Examiner*—Satish Rampuria
(74) *Attorney, Agent, or Firm*—Workman Nydegger

(57) ABSTRACT

In processing an external function for which source code is not available, such as an application program interface (API), a model is used to evaluate whether the external function is properly invoked. An error potentially resulting from improper invocation of the external function and at least one condition that will result in the potential error are identified. The model is created to test for the condition that will result in the potential error. When the condition is found, generation of an error message is triggered. The model is associated with a source code analyzer such that when the source code is analyzed by the source code analyzer, the model is applied to evaluate invocation of the external function. The potential error and conditions that result in the error, such as input/output parameter errors and dependency errors, may be derived from documentation describing the operation of the external function or API.

9 Claims, 14 Drawing Sheets

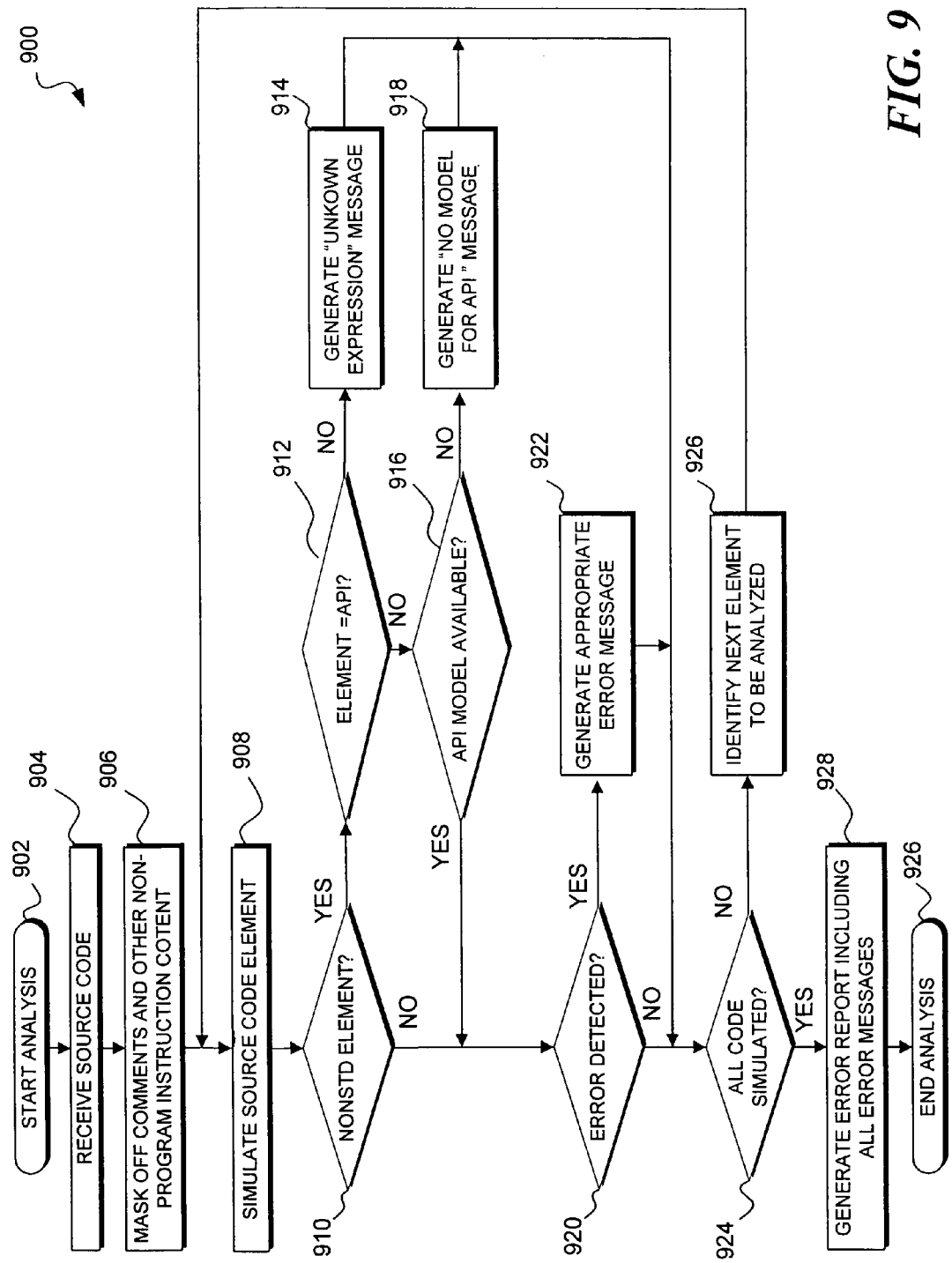

CUSTOM API MODELING FOR SOURCE CODE STATIC ANALYSIS SIMULATOR

FIELD OF THE INVENTION

The present invention generally pertains to computer software development, and more specifically, to a method and system for improving evaluation of computer source code to detect programming errors.

BACKGROUND OF THE INVENTION

The ever-improving price-performance of microprocessors, random-access memory (RAM), and storage systems over the past decade has affected how computer software is developed. In the past, when hardware resources were more expensive, source code often was written in assembly language. Writing code in a low-level language was more time-consuming for developers, but resulted in somewhat more efficient and compact code. However, as a result of the improving price-performance of processors, memory, and storage, increasingly more programming is performed in high level languages, such as C/C++, Visual Basic, and others, to minimize the cost of software development.

Better tools for software developers have been created that make software creation more efficient and productive and take further advantage of the improved computing systems that are available. For example, static source code analysis tools help software developers to identify errors by deducing possible behavior of the source code. Some static source code analysis tools compile the code to identify syntax defects that the conventional compiler may not have detected that result in violation of programming language rules. Some static source code analysis tools do not include a compiler but, instead, intercept the output of an external compiler, parse the compiled code and analyze it. Once the static source code analysis tools have evaluated the source code for possible syntax errors, the representation of the source code generated by the code analyzer further allows the code to be evaluated for semantic problems by the simulator. Thus, static source code analysis tools help to detect syntax errors that may not have been detected by a compiler, as well as semantic errors that would not be detected by a compiler.

FIG. 1A shows a block diagram of a conventional (prior art) static source code analyzer 100a. Source code 102a prepared by a software developer is input to static source code analyzer 100a. The source code is first parsed by an input processor 104a, which ignores header blocks and comments, reducing the source code to a list of standard programming instructions 106a that are submitted to a simulator 108a. Simulator 108a identifies syntactic and semantic errors in the source code. For example, expressions that are misused, misspelled, or fail to contain proper arguments or delimiters are identified as syntactic errors. In addition, simulator 108a identifies errors that are other than literal or syntactic. For example, if the source code accesses memory that might not be properly initialized, simulator 108a identifies the error. For another example, if the source code requires a variable be initialized and within certain bounds, but the variable is not initialized or is invalid due to the value of the variable transcending the predetermined bounds, simulator 108a identifies also identifies the errors. Errors identified by simulator 108a are presented in an error report 110a that can be used by software developers to revise and repair their source code.

FIG. 1B shows an exemplary screen 120 from a prior art source code analyzer. In the source code analyzer, source code 122 submitted for analysis is viewable in a source code window 124, while error messages 126 are presented in an analysis window 128. Error messages 126 include correlations 130 with lines 132 in source code 122 to assist a software developer in correcting the error.

Static source code analyzers are tremendously helpful to software developers both in that they assist software developers in identifying problems that might interfere with compiling of the source code, or even if the source code compiles without incident, might cause the software to fail in operation. Static source code analyzers do not replace testing to determine if the resulting software functions as intended. However, by presenting developers with error messages 126 including correlations to specific lines 132 in source code 122, static source code analyzers allow developers to quickly address potential syntactic and semantic problems in their source code.

The accuracy of static source code analyzers depends on their ability to interpret the source code presented. As a result, some errors in the source code might be missed. In addition, if the static source code analyzer incorrectly interprets the source code being analyzed, false positives may be generated when the source code being evaluated is correct. Unfortunately, the occurrence of false positives amounts to noise that obscures error messages indicating actual errors in the source code. As a result, an actual error in the software code being analyzed may be overlooked by the software developer.

Other tools that are very helpful to software developers are software developer kits. Software developer kits are typically created for specific operating systems, such as Microsoft WINDOWS™, or computing or game platforms, such as the Microsoft XBOX™, to make software development easier by enabling access to previously-created software tools. These software development kits may include source code for pre-written routines that perform common functions likely to be included by developers in their code. By providing convenient access to such software routines, developers need not waste time rewriting common routines that already have been created.

Software development kits also may include application program interfaces or application programming interfaces (APIs) that can be accessed in the operating environment for which the developer is creating software. APIs can be used to invoke services to generate graphics, generate sounds, and any number of other functions. In addition, APIs that invoke differently implemented but functionally comparable services can be used to provide source code software portability between different platforms for which the source code can be compiled. Perhaps most significantly, APIs are useful for providing an interface between high level language source code and lower level utilities that operate more directly with the hardware devices of the operating environment.

APIs are often distributed separately or as part of a software development kit, in a collection of binary libraries. Typically, the source code used to create the APIs are not distributed or otherwise made available to developers. The source code is not made available to protect various proprietary concerns of the developers of the operating environment. However, even though the source code implementation of the API is not made available, documentation or other information may be made available with the software development kit that explains the operation of the API, the proper syntax for invoking the API, arguments to be passed to the API, and characteristics of values returned by the API.

Unfortunately, submitting source code that invokes one or more APIs to a static source code analyzer may result in the generation of a number of errors. As described above, a source code analyzer is only accurate to the extent that it is configured to understand the source code. Thus, a static source code analyzer may be unable to analyze an API signature, because the static source code analyzer is only presented with the API signature and cannot access the source code implementation of the API.

As shown in the prior art example of FIG. 1C, when analyzing source code 102c, input processor 104c of static source code analyzer 100c will recognize API signature(s) 152 as distinct from standard programming instructions 106c. API signature(s) 152 may be regarded as a syntax error in error report 110c, because the API signature represents a nonstandard expression. Alternatively, for example in C++, an "extern" designation can be appended to API signature(s) 152, which will prevent simulator 108c from attempting to evaluate the semantics of API signature(s) 152. Without the source code implementation of the API, a static source code analyzer may be able to evaluate the syntax of an API call by determining whether appropriate arguments are passed to the API in accordance with the API signature. However, without the source code, a static source code analyzer cannot semantically evaluate API signature(s) 152, their behavior, of their effect on source code that invokes API signature(s) 152. Upon encountering the "extern" designation, the static source code analyzer makes no attempt to semantically evaluate the expression that follows.

Without access to the source code implementation of the API, the static source code analyzer cannot determine what effect the API might have, for example, on arguments passed to the API. As a result, static source code analyzer 108c may generate an error message with regard to a problem with a variable when, in fact, that problem is actually related to the API. As a result, inclusion of API signatures in source code may result in a great deal of false positive error messages or noise being generated by the source code analyzer that may, unfortunately, divert attention away from actual true error messages. In addition, because the source code analyzer may not be able to evaluate an API call or it effects, the source code analyzer will not be able to detect errors resulting from such an API call. The API may perform an operation on an argument that was passed to it that will result in an illegal operation at some subsequent point in the source code. Thus, if the source code analyzer is incapable of evaluating the operation of the API, the source code analyzer may fail to detect related errors in the source code.

It would therefore be desirable to provide a method and system that is able to evaluate API calls, even without having access to the source code implementation of the API.

SUMMARY OF THE INVENTION

Accordingly, one advantage of the present invention is that it provides a method and a system for evaluating external function calls, such as API calls, even when the source code implementation of the external function call is not available. Typical, known source code analyzers ignore external function calls and as a result, may miss errors in the invocation of the external function, or flag false positives when in fact, the error detected was resolved by the external function call. Because the source code for the external function is not available, the function source code itself cannot be incorporated into source code and analyzed. However, because the function source code is not made available, the provider of the external function may provide documentation or other information describing operation of the external function. This documentation enables a software developer to understand what parameters are passed to the external function, what parameters are output by the external function, what are prerequisite functions on which the API depends, as well as other important information. From this descriptive information, a model can be developed to insure that the API is properly invoked. A set of primitives included with the static source code analyzer according to an embodiment of the present invention provides a user with a way to model the function of the API so that the static source code analyzer can evaluate the behavior and effect of API calls.

One aspect of the present invention is thus directed to a method for analyzing invocation of an external function for which function source code implementation is not available. At least one potential error resulting from an improper invocation of the external function by source code is identified, and at least one condition that will result in the potential error is identified. A model of the external function is employed that is useful to test for the at least one condition resulting in the potential error, and which is able to initiate generation of an error message when the condition is found. The model is associated with a source code analyzer such that, when the source code is analyzed by the source code analyzer, the model is applied to evaluate invocation or operation of the external function.

The external function may include an API. Identifying the at least one condition that will result in the potential error is made based on information describing operation of the external function. The condition may include an incorrect input type of an input parameter acceptable to the application program interface, or an incorrect input content range of the input parameter acceptable to the API. Similarly, the condition may include an incorrect output for an output parameter generatable by the API, or an incorrect output content range of the output parameter generatable by the API. The condition also may include a failure to invoke a prerequisite function that must be invoked prior to the invocation of the external function, or a failure to invoke a post-requisite function that must be invoked after the invocation of the external function.

The model may be created using a plurality of primitives usable to test for the at least one condition that results in the potential error. The source code analyzer includes a model repository configured to store the model created, such that the source code analyzer can access the model upon evaluating source code and identifying a reference to the external function.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 9 is a flow diagram illustrating the logical steps for analyzing source code according to an embodiment of the present invention.

DESCRIPTION OF THE PREFERRED EMBODIMENT

Exemplary Computing System for Implementing Present Invention

Figure 2:
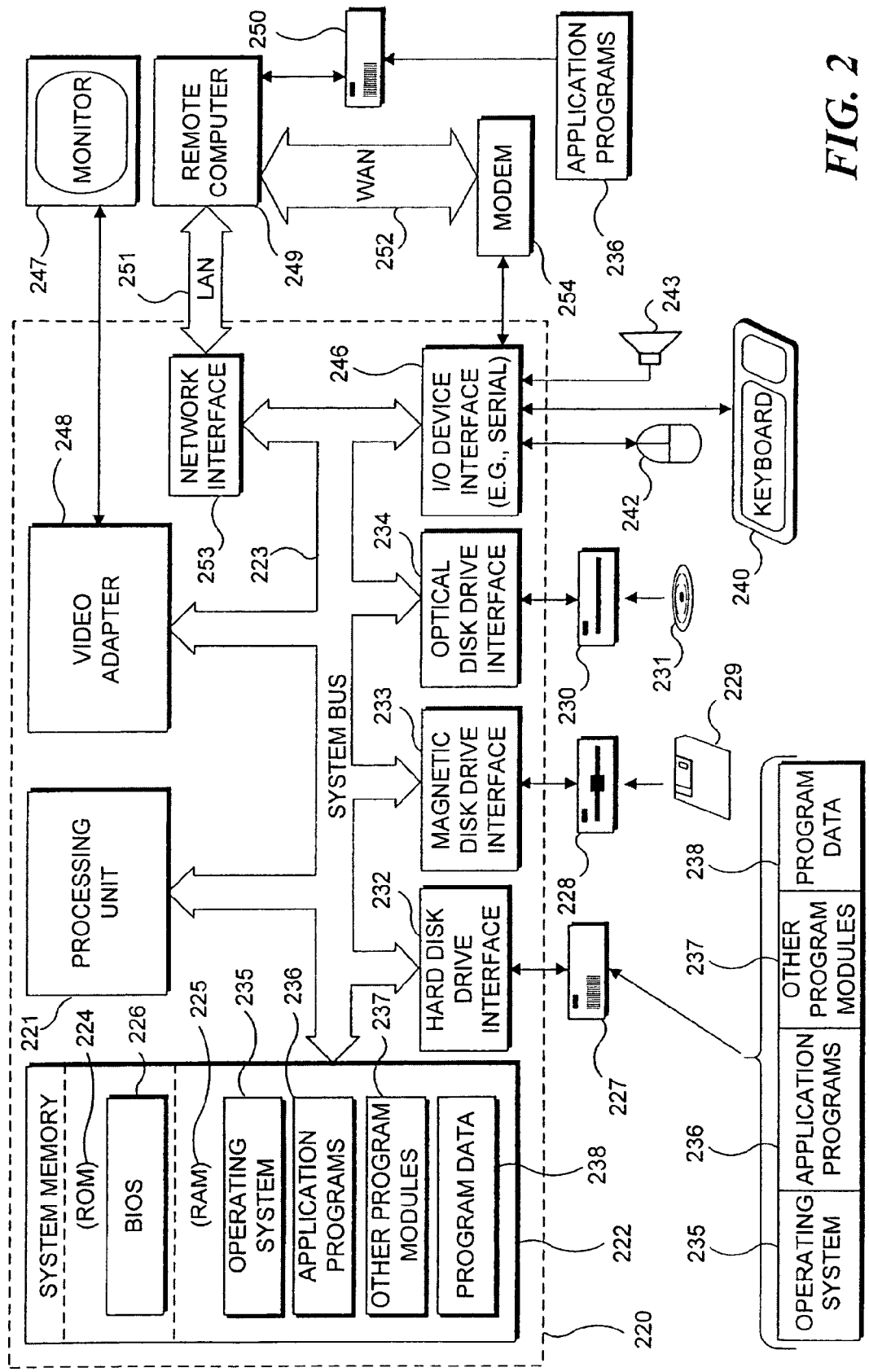
FIG. 2 is a functional block diagram of a computing device or personal computer (PC) adaptable to use an embodiment of the present invention.

With reference to FIG. 2, an exemplary conventional computing system suitable for use with an embodiment of the present invention is shown. The system includes a general purpose computing device in the form of a PC 220a, provided with a processing unit 221, a system memory 222, and a system bus 223. The system bus couples various system components including the system memory to processing unit 221 and may be any of several types of bus structures, including a memory bus or memory controller, a peripheral bus, and a local bus using any of a variety of bus architectures. The system memory includes read only memory (ROM) 224 and random access memory (RAM) 225. A basic input/output system 226 (BIOS), containing the basic routines that help to transfer information between elements within the PC 220, such as during start up, is stored in ROM 224. PC 220 further includes a hard disk drive 227 for reading from and writing to a hard disk (not shown), a magnetic disk drive 228 for reading from or writing to a removable magnetic disk 229, and an optical disk drive 230 for reading from or writing to a removable optical disk 231, such as a compact disk-read only memory (CD-ROM) or other optical media. Hard disk drive 227, magnetic disk drive 228, and optical disk drive 230 are connected to system bus 223 by a hard disk drive interface 232, a magnetic disk drive interface 233, and an optical disk drive interface 234, respectively. The drives and their associated computer readable media provide nonvolatile storage of computer readable machine instructions, data structures, program modules, and other data for PC 220a. Although the exemplary environment described herein employs a hard disk, removable magnetic disk 229, and removable optical disk 231, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 229, optical disk 231, ROM 224, or RAM 225, including an operating system 235, one or more application programs 236, other program modules 237, and program data 238. A user may enter commands and information in PC 220 and provide control input through input devices, such as a keyboard 240 and a pointing device 242 that communicate with system bus 223 via I/O device interface 246. Pointing device 242 may include a mouse, stylus, wireless remote control, or other pointer, but in connection with the present invention, such conventional pointing devices may be omitted, since the user can employ the interactive display for input and control. As used hereinafter, the term "mouse" is intended to encompass virtually any pointing device that is useful for controlling the position of a cursor on the screen. One or more audio input/output devices 243, including headsets, speakers, and microphones, also engage personal computer 220 via I/O device interface 246. Still further input devices (not shown) may include a joystick, haptic joystick, yoke, foot pedals, game pad, satellite dish, scanner, or the like. These and other input/output (I/O) devices are often connected to processing unit 221 through an I/O interface 246 that is coupled to the system bus 223. The term I/O interface is intended to encompass each interface specifically used for a serial port, a parallel port, a game port, a keyboard port, and/or a universal serial bus (USB). A monitor 247 is connected to system bus 223 via an appropriate interface, such as a video adapter 248. It will be appreciated that PCs are often coupled to other peripheral output devices (not shown), such as speakers (through a sound card or other audio interface—not shown) and printers.

PC 220 can also operate in a networked environment using logical connections to one or more remote computers, such as a remote computer 249. Remote computer 249 may be another PC, a server (which is typically generally configured much like PC 220a), a router, a network PC, a peer device, or a satellite or other common network node, and typically includes many or all of the elements described above in connection with PC 220a, although only an external memory storage device 250 has been illustrated in FIG. 2. The logical connections depicted in FIG. 2 include a local area network (LAN) 251 and a wide area network (WAN) 252. Such networking environments are common in offices, enterprise wide computer networks, intranets, and the Internet.

When used in a LAN networking environment, PC 220 is connected to LAN 251 through a network interface or adapter 253. When used in a WAN networking environment, PC 220 typically includes a modem 254, or other means such as a cable modem, Digital Subscriber Line (DSL) interface, or an Integrated Service Digital Network (ISDN) interface for establishing communications over WAN 252, such as the Internet. Modem 254, which may be internal or external, is connected to the system bus 223 or coupled to the bus via I/O device interface 246, i.e., through a serial port. In a networked environment, program modules, or portions thereof, used by PC 220 may be stored in the remote memory storage device. It will be appreciated that the network connections shown are exemplary and other means of establishing a communications link between the computers may be used, such as wireless communication and wide band network links.

Source Code Analyzer Adapted to Evaluate APIs

Figure 1A:
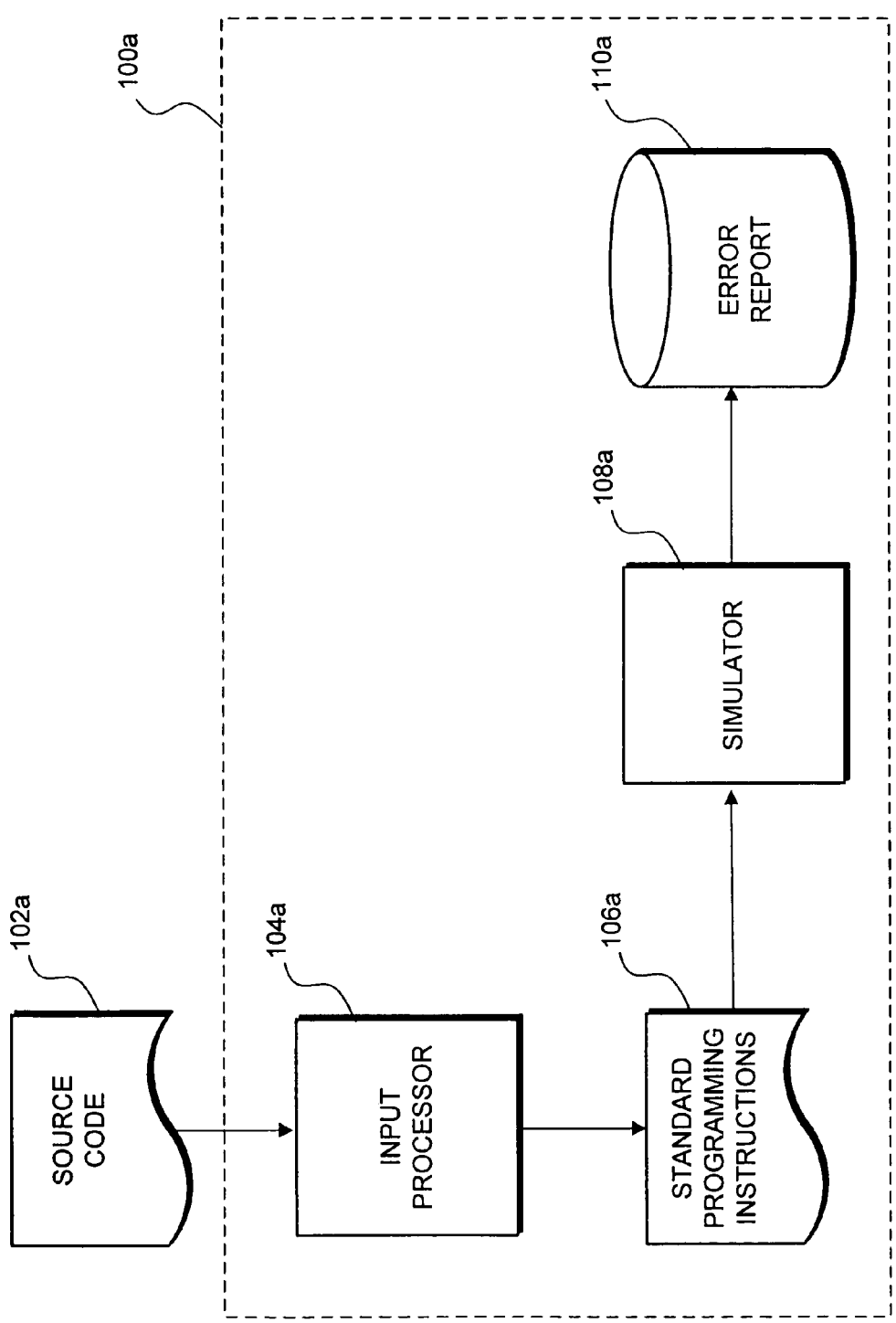
FIG. 1A (Prior Art) is a functional block diagram of a typical static source code analyzer.
Figure 1B:
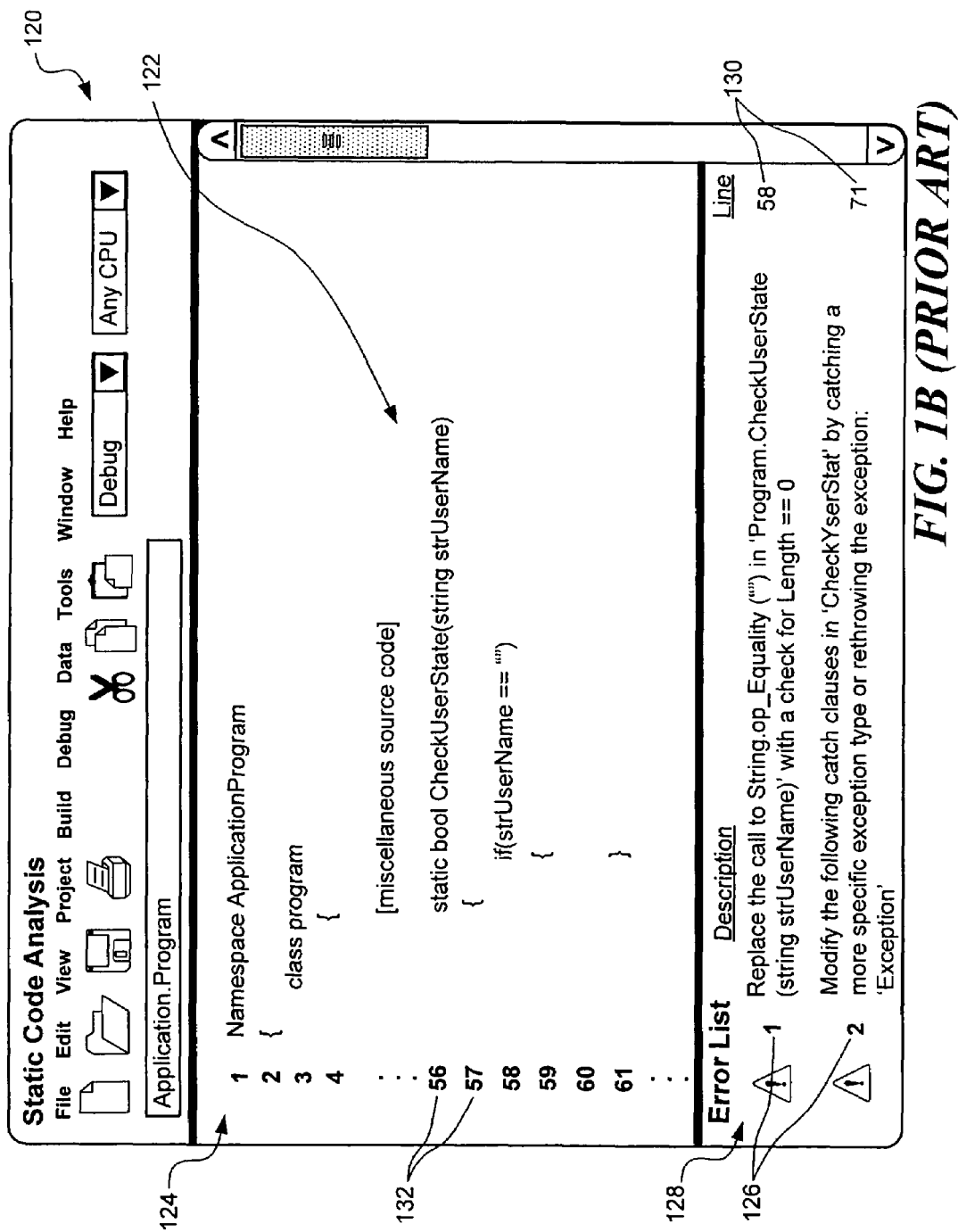
FIG. 1B (Prior Art) is a screen from a typical static source code analyzer.
Figure 1C:
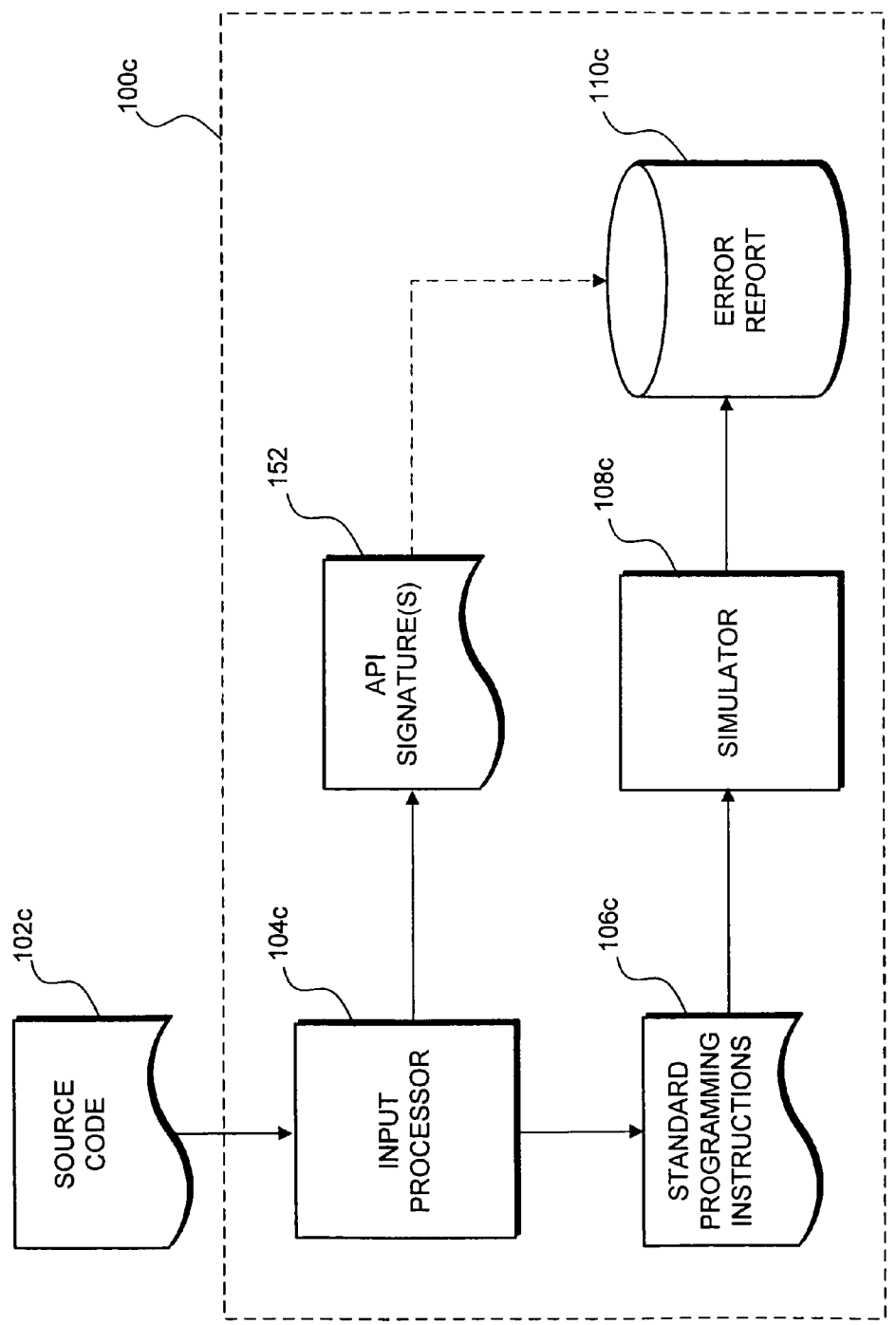
FIG. 1C (Prior Art) is a functional block diagram of a typical static source code analyzer confronting an API signature.
Figure 3:
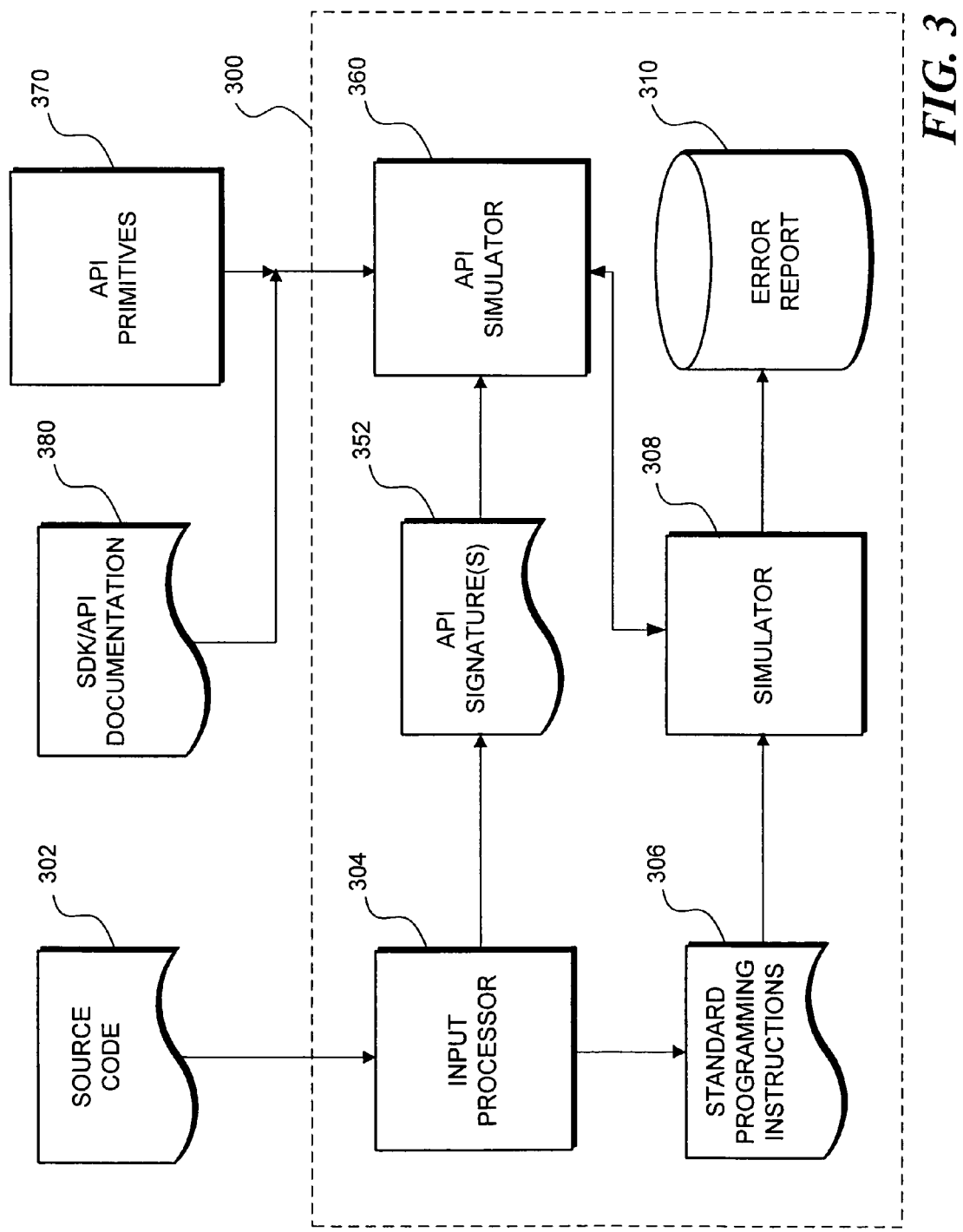
FIG. 3 is a functional block diagram of a static source code analyzer employing an embodiment of the present invention to evaluate API signatures.

FIG. 3 shows a block diagram of a static source code analyzer 300, which includes some attributes of a conventional static source code analyzer, as described above in connection with FIGS. 1A and 1C. Source code 302 is prepared by a software developer and is submitted to static source code analyzer 300 for detection of potential errors. The source code is parsed by an input processor 304. The input processor disregards comments, header blocks, lines prefixed with "extern" or similar syntax, etc., thereby identifying standard programming instructions 306 which are analyzed by simulator 308. In addition, one or more external function calls or API signatures 352 may be recognized by input processor 304. In the following description, the external functions invoked are described as APIs. Notwithstanding, embodiments of the present invention are useful to evaluate errors that may arise as a result of improper invocation or operation of other external function calls for which source code is not available to static source code analyzer 300.

As described above, conventionally, appending the designation "extern" or a similar identifier to a declaration of an API signature indicates that the expression representing the API invokes an external routine for which the source code implementation is not available. As is understood in the art, the "extern" designation communicates to the compiler not to attempt to resolve any subsequent invocation of the external routine. The linker will be responsible for locating the object code of the invoked function, and resolving the code implementation of the external function at a binary level after compiling. In addition, the "extern" designation communicates to a conventional static source code analyzer not to attempt to semantically analyze the designated external function. Nonetheless, the static source code analyzer may evaluate the syntax of subsequent external function calls to ensure that invocations of the external function comport with the syntax of the function as specified.

According to embodiments of the present invention, potential API signatures 352 identified are submitted to API simulator 360. API simulator 360 evaluates potential API signatures 352 to determine if the syntax is correct, if proper arguments are passed to the API, if the arguments passed are of the appropriate type, and to otherwise evaluate API signatures 352 for the presence of coding errors. A determination of whether API signatures 352 are of the correct form is communicated by API simulator 360 to simulator 308. Using the information provided by API simulator 360, simulator 308 generates error messages in error report 310 for API signatures 352 that include errors. Conversely, false positives that may have been flagged as errors by simulator 308 due to its lack of familiarity with API signatures 352 are not reported as errors in error report 310.

It will be appreciated that if the source code implementation of an API is available to the software developer, the software developer can incorporate the API source code implementation in software developer's source code 302 for simulator 308 to evaluate, along with the rest of source code 302. However, as described above, generally APIs are provided only in their object code form in binary libraries that enable the APIs to be linked with other object code modules compiled from source code 302. Beneficially, embodiments of the present invention do not require the provider of the API to supply the API's source code implementation.

Instead, for each API signature that is contemplated, expected, or desired to be used with source code 302, API simulator 360 includes a model for the evaluation of each API signature. For example, models may be developed for a group of APIs identified as the most likely to be called. As a result, most noise that would otherwise be included in error report 310 due to false positives can be eliminated without having to include models of every API that might be called.

API simulator 360 includes models derived from information preferably provided by the API developer in SDK and/or API documentation 380 that is made available to software developers. Generally, SDK/API documentation 380 describes the functioning of the API, indicates the arguments to be provided to the API, what form of values are required or usable by the API, and other functional characteristics of the API. SDK/API documentation 380 is used to model APIs using API primitives 370. API primitives 370 include a set of routines packaged in a modeling library associated with the simulator that can be employed by a user to model the function of an API, so that API simulator 360 can evaluate the effect of an API invoked by the source code. Use of API primitives 370 is described further below.

Thus, using API primitives 370 and reviewing SDK/API documentation 380, even without access to the API source code, some rules can be derived to evaluate invocation and/or operation of API signature(s) 352 that may be included in source code 302 submitted to static source code analyzer 300. These rules are included in API simulator 360 and can be applied to potential API signatures 352 that are identified. The identified API signatures are then evaluated to determine if they use the appropriate syntax, pass appropriate arguments to the API, and otherwise adhere to the rules of the API, to evaluate whether the API signatures in source code 302 are valid. If API simulator 360 is applied to determine if API signature(s) 352 identified in the source code are implemented correctly, no error messages will be reported in error report 310. On the other hand, if the mistake is made in invoking the API in source code 302, API simulator 360 conveys this error message to simulator 308. Thus, simulator 308 can include appropriate error messages regarding API signatures that were identified in source code 302, in error report 310.

Preferably, API simulator 360 not only evaluates the standalone syntax and signature structure of the indication of the API, but also is configured to communicate to simulator 308 whether API signatures included in source code 302 resolve other potential errors in source code 302 detected by simulator 308. As a simple example, the API may evaluate an argument passed to the API and truncate or round its value beyond certain limits to acceptable values. Accordingly, if simulator 308 detects that a particular value is out of bounds, based on source code 302, simulator 308 can query API simulator 360 to determine if an API resolves the potential error. If so, no error message will be reported in error report 310, further reducing the incidence of false positive error messages.

In addition, API models included in the API simulator may include dependency rules. For example, it is possible that before an API is called, an argument passed to the API must be initialized, or another API or some other function on which an API depends must be invoked. API simulator 360 can include that dependency rule, so that an error will be generated by static source code analyzer 300 if the dependent function is not invoked before the API is invoked. Similarly, if it is necessary that an API invoke another function or API after it is called, API simulator 360 also can include that rule to generate an error if the function or API is not called as required.

As described above, many APIs are provided in binary libraries, and the source code used to implement the APIs is not made available to software developers that will use them. Embodiments of the present invention model identify expected APIs based on documentation provided with APIs or SDKs to enable static source code analyzer 300 to substantively evaluate API calls, as further described below.

It will be appreciated that, although static source code analyzer 300 depicts input processor 304 as causing standard programming instructions and API signature(s) 352 to be processed independently, simulator 308 and API simulator 360 preferably work cooperatively to evaluate whether APIs have been invoked properly and whether the APIs function properly with the source code.

Conventional Static Source Code Analyzer's Treatment of an Exemplary API

For purposes of illustration, an exemplary API is presented that receives two arguments and returns a success/failure value. Before the API is called, the memory block pointed to by the second parameter is not initialized. The API performs some operations on the memory block pointed to by the second parameter. However, if the first parameter fails to meet a certain condition, the functions will not be performed on the memory block pointed to by the second parameter and in fact the memory will not even be initialized. Accordingly, if failure to initialize the memory block is a problem, that problem will not be detected by a conventional static source code analyzer operable to evaluate the effect of the API.

More specifically, the exemplary API uses the following API signature and source code implementation:

```
#define SOME_VALUE 10
bool SomeFunctionAPI(int a, int* b)
{
    if(a > 0) {
        *b = SOME_VALUE * a;
        // additional code not disclosed to developers
        .
        .
        .
        // additional code not disclosed to developers
        return true;
    }
    return false;
}
```

Whatever actions are performed by the "additional code," the memory block to which b points is only initialized and acted upon if the first parameter, a, is greater than zero.

Further assume that the API is referenced by source code that a user desires to submit for static source code analysis:

```
extern bool SomeFunctionAPI(int z, int* x)
typedef signed int INT;
typedef void VOID;
VOID main( )
{
    INT q, x, y, z;
    SOME_KNOWN_FUNCTION(q);
    SomeFunctionAPI(z, &x);
    y = 1/x;
}
```

The static source code analyzer does not have access to the source code implementation of SomeFunctionAPI. Accordingly, a conventional static source code analyzer may analyze the syntax used to invoke SomeFunctionAPI, but, without access to the source code implementation, will not evaluate the semantics of the API call.

A potential problem arises in the line of source code following the API call, y=1/x. A conventional static source code analyzer without access to the source code implementation of the API is not able to determine what value of x may be returned by the API. In examining the source code implementation of the API, x will be initialized if z is greater than zero, but x will not be initialized if z has a value less than or equal to zero. Variable x is not otherwise initialized by the source code invoking the API. Thus, if x is not initialized, the expression y=1/x will result in division by an uninitialized variable. On the other hand, if z is greater than or equal to zero, x is initialized and set to a nonzero value, thus expression y=1/x will yield a defined, acceptable result. Furthermore, even if z were not initialized, it is not possible to predict the result of the API on the value of x, even with access to the source code implementation.

Some conventional simulators may make assumptions about x. Hypothetically, for example, a static source code analyzer may assume that x is initialized. On the other hand, the static source code analyzer may also be configured to assume that, if x is not initialized by the source code invoking the API, x will not be initialized by the API. Similarly hypothetically, the static source code analyzer may assume that the value of x returned by the API is zero or is not equal to zero. In any case, the static source code analyzer can only guess at the value of x because a conventional static source code analyzer is not able to determine what value of x may be returned by the API.

As a result, because the value of x cannot be determined by a conventional static source code analyzer, the y=1/x expression presents a problem. Depending on what assumptions are made by the conventional static source code analyzer, the static source code analyzer may fail to detect errors, generate false error messages, or yield an appropriate response purely by happenstance, as further described below.

Exemplary API Modeled According to an Embodiment of the Present Invention

Even without the API developer disclosing the source code implementation of the API, according to embodiments of the present invention, the static source code analyzer is adapted to correctly identify potential errors in source code.

Figure 4:
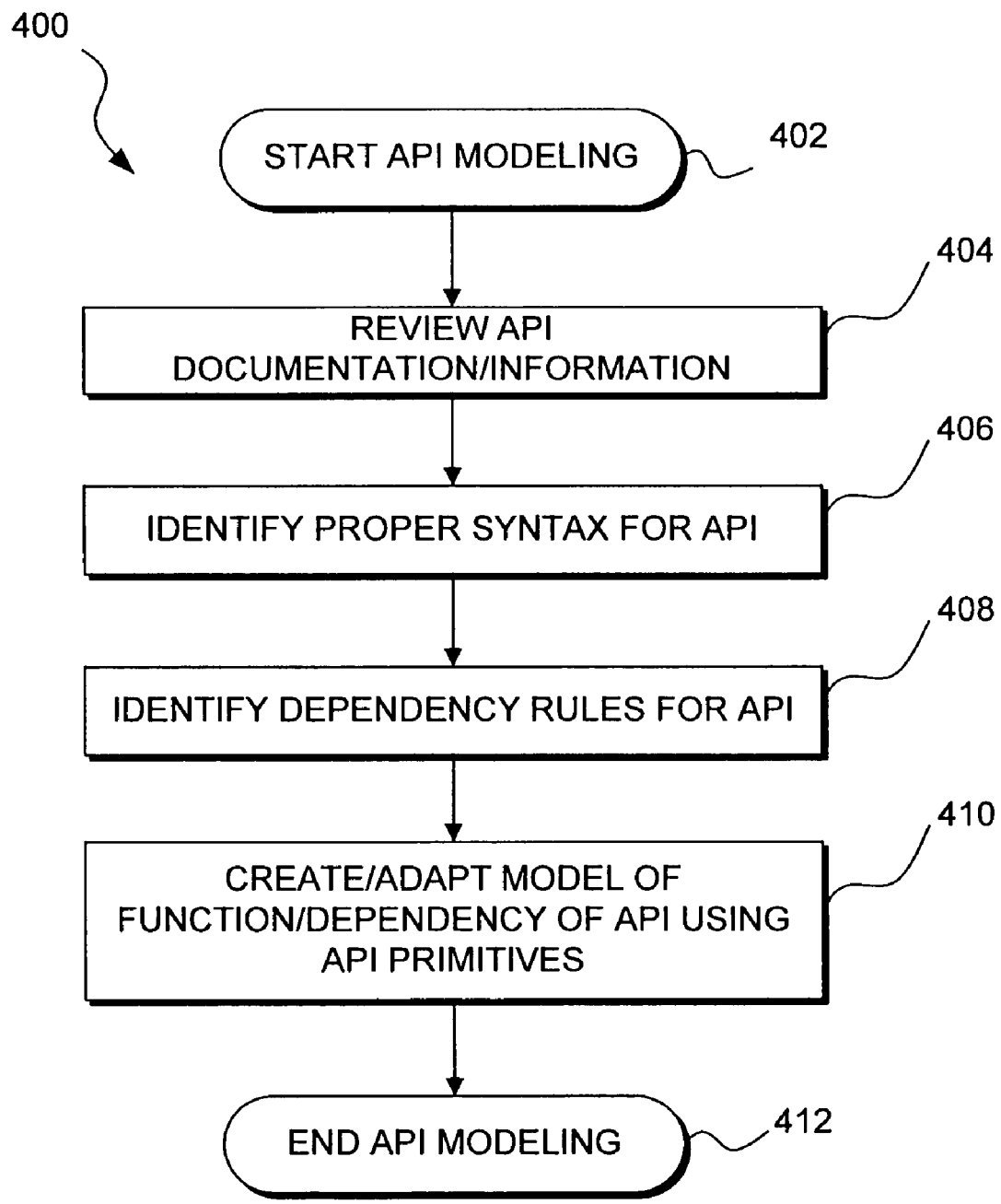
FIG. 4 is a flow diagram illustrating the logical steps for creating an API model for a static source code analyzer.

FIG. 4 illustrates a flow diagram 400 showing the logical steps for modeling an API according to an embodiment of the present invention. API modeling begins at a step 402. At a step 404, API documentation or other information about the functioning of the API is reviewed. Based on this review of the API information, at a step 406, proper syntax for the API is identified. At a step 408, dependency rules for the API are identified. For example, the dependency rules may specify whether certain arguments or memory indicated by pointers passed to the API must be initialized, etc., as well as whether functions that must be invoked after the API. At a step 410, a state object is created to model the function and/or dependency of the API. API modeling ends at a step 412.

Static source code analyzers typically use state objects to track the state of program elements and variables. Thus, for example, in the preceding example of the routine invoking the API, if a function for which the source code implementation is known is invoked that affects the value of x, a state object could be used to track the value of x to determine whether division by x in the statement y=1/x yields a valid result. Recognizing the known syntax and rules of the source code, state machines may be used, for example, to determine whether a primitive such as an unsigned integer is used in a manner consistent with the primitive being an unsigned integer.

According to embodiments of the present invention, a user can study the documentation describing the API and, using API primitives 370 (FIG. 3), create a model that the static source code analyzer can access and employ to evaluate the function of the API. API primitives 370 include signatures that can specify a plurality of arguments that can be used to evaluate the arguments to determine if they meet certain conditions to determine whether an API is invoked properly, whether the API yields a valid result, and similar determinations.

Considering the exemplary API, assume that API documentation provides the following information:
SYNTAX:

```
bool SomeFunctionAPI(int A, int* pB)
```
Parameters:
   A, is an [in] parameter, a signed integer, and must be initialized to a value between $INT\_MIN$ and $INT\_MAX$.
   pB, is an [out] parameter, a pointer to a signed integer, and cannot be NULL.

Return Values:
   If the method succeeds, the return value is true; otherwise the return value is false.

FUNCTION:
Initializes the memory block pointed to by parameter pB based on the value of parameter A.

DEPENDENCIES:
None

LIMITATIONS:
If parameter A is not initialized, the method behavior is undefined.
If parameter A is initialized to a value >0, the memory block pointed to by parameter pB is initialized to a non-zero value, the method call succeeds and returns true.
If parameter A is initialized to a value <=0, the memory block pointed to by parameter pB is not accessed and might remain uninitialized if not previously initialized, the method fails and returns false.

With descriptions of the function of the API and limitations regarding the use of the API, even without access to the source implementation, the operation of the API can be modeled and simulated by the static source code analyzer according to an embodiment of the present invention.

As previously described in connection with FIG. 3, in one embodiment of the present invention, API primitives are provided with static source code simulator in a modeling library that allow the static source code simulator to model the behavior of APIs. The API primitives relate to functions that deal with memory initialization, buffers, pointers, memory allocation, and other functions that may be performed by an API. The API primitives can be used to specify that certain conditions must hold when an API is called, and certain results are expected or hold true when the call to the API returns.

Using the preceding API documentation, the API SomeFunctionAPI may be modeled using a number of exemplary API primitives having specified primitive signatures and functions. For example, syntax and functional descriptions are provided for four API primitives that can be used to model the function of an API based on what is known about the API from the API or SDK documentation even without access to the source code implementation:

CheckIntegerIsInitialized(int x)—A primitive signature that verifies whether the integer parameter x is both initialized and within the bound of INT_MIN & INT_MAX. If the integer parameter x does not meet the specified conditions, the simulator generates an uninitialized variable warning.

CheckIntegerBoundsGreaterEqual(int x, int lower_bound, int upper_bound)—A primitive signature that verifies that the value of integer parameter x is greater than or equal to the value of integer parameter lower_bound but less than or equal to the value of integer parameter upper_bound. If parameter x does not meet the specified conditions, the simulator generates a bounds violation warning.

CheckPointerIsValid(int* p)—A primitive signature that verifies that parameters, a pointer to an integer variable points to valid memory, thereby verifying that valid memory is available for the storage of data. If the integer pointer does not point to valid memory, the simulator generates a NULL pointer dereference warning.

ReturnIntegerValueGreaterThan(int* p, int lower_bound)—A primitive signature that indicates to the simulator that parameter p, a pointer to an integer variable is to be initialized to a value greater than the value of parameter lower_bound. Accordingly, when the simulator parses an expression involving division by the integer variable accessed by pointer p subsequent to the API call, the simulator then will not generate a division by zero or division by undefined value warning.

As will be appreciated, there can be any number of API primitives to correspond with any number of actions that potentially are performed by APIs or other external functions.

Using the some of the API primitives, based on information about the API derivable from the API documentation, the API SomeFunctionAPI may be modeled to facilitate a more accurate evaluation of the source code by the static source code analyzer:

```
bool SomeFunctionAPI(int a, int* b)
{
        CheckIntegerIsInitialized(a);
        CheckIntegerBoundsGreaterEqual(a, 1, INT_MAX);
        CheckPointerIsValid (b);
        ReturnIntegerValueGreaterThan(&b, 0);
}
```

Thus, when the simulator identifies a call to SomeFunctionAPI, the simulator API searches a repository of models checked by the static source code simulator. Upon finding the model for SomeFunctionAPI, accesses the model to assist in evaluating behavior of the source code, including the behavior of the APIs represented by a model in the repository of models. Accordingly, as further described below, the static source code analyzer is able to identify semantic errors related to the use of APIs that might be missed, as well as to reduce noise and false positive error messages that might be generated by a static source code analyzer not able to access the source code implementations of APIs invoked by the source code.

Graphical Description of State Object Representing Potential Model of an API

Figure 5:
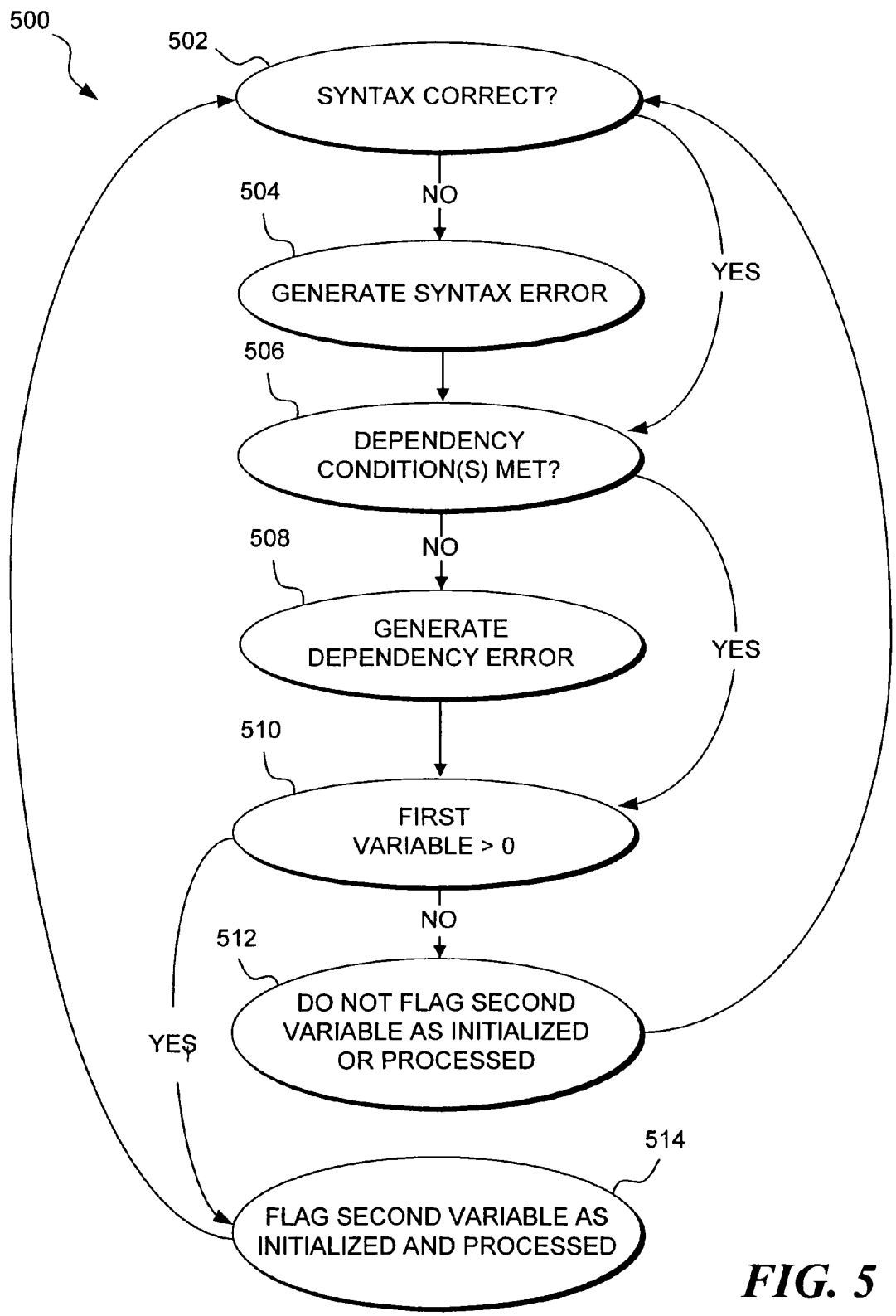
FIG. 5 is a state diagram of a state object modeling the function of an API as derived from a description of the function of the API.

FIG. 5 is a graphical depiction of a state object 500 created to model the exemplary API. It should be noted that state object 500 uses only the information provided in the API documentation, yet augments the static source code analyzer to meaningfully evaluate the invocation of the API within the context of the source code.

State object 500 includes a state 502 to evaluate the syntax of the API call. Because the API is designated as an external function by declaring it using "extern" syntax, a conventional static source code analyzer will recognize that the "extern" syntax invokes a module for which source code is not available and will ignore the remaining syntax of the expression. Accordingly, state 502 augments the static source code analyzer to enable it to determine if the defined syntax of the API call is used. State 502 may include a plurality of states sequentially tested to determine if a series of required arguments are supplied. If not, at a state 504 a syntax error is generated that will be included in the error report produced by the static source code analyzer. On the other hand, if the syntax is correct, or once a syntax error is generated at state 504, state object 500 advances to a state 506.

At state 506, it is determined if the dependency conditions of the API are met. If not, at a state 508, a dependency error is generated that is included in the error report produced by the static source code analyzer. A dependency error may exist, for example, if the API is to be invoked only after another API has been called or some other function must be performed, as specified in the API documentation. A plurality of dependency checking states 506 may be included, each of which evaluates a particular dependency. If the dependencies have been met or once a dependency error is generated at state 508, state object 500 advances to a state 510.

At state 510, it is determined if the first variable is greater than zero. If not, at a state 512, the second variable is not flagged as having been initialized or processed. On the other hand, if it is determined at state 510 that the first variable is greater than zero, at a state 514, the second variable is flagged as having been initialized and processed.

State object 500 operates in concert with other state objects employed by the static source code analyzer. Thus, for example, when x is defined, a state object is created for it by the static source code analyzer. Because x has not been initialized, its state object indicates that it has not been initialized. Without some understanding of the functioning of the API, the static source code analyzer may assume that the API either never initializes the [out] variables, thus resulting in a false positive, or always initializes the [out] variables, thereby overlooking a potential problem. Thus, modeling the API in the present invention ensures that better and more accurate information is provided to a user.

Static Source Code Analysis of Code Invoking Exemplary API

Figure 6A:
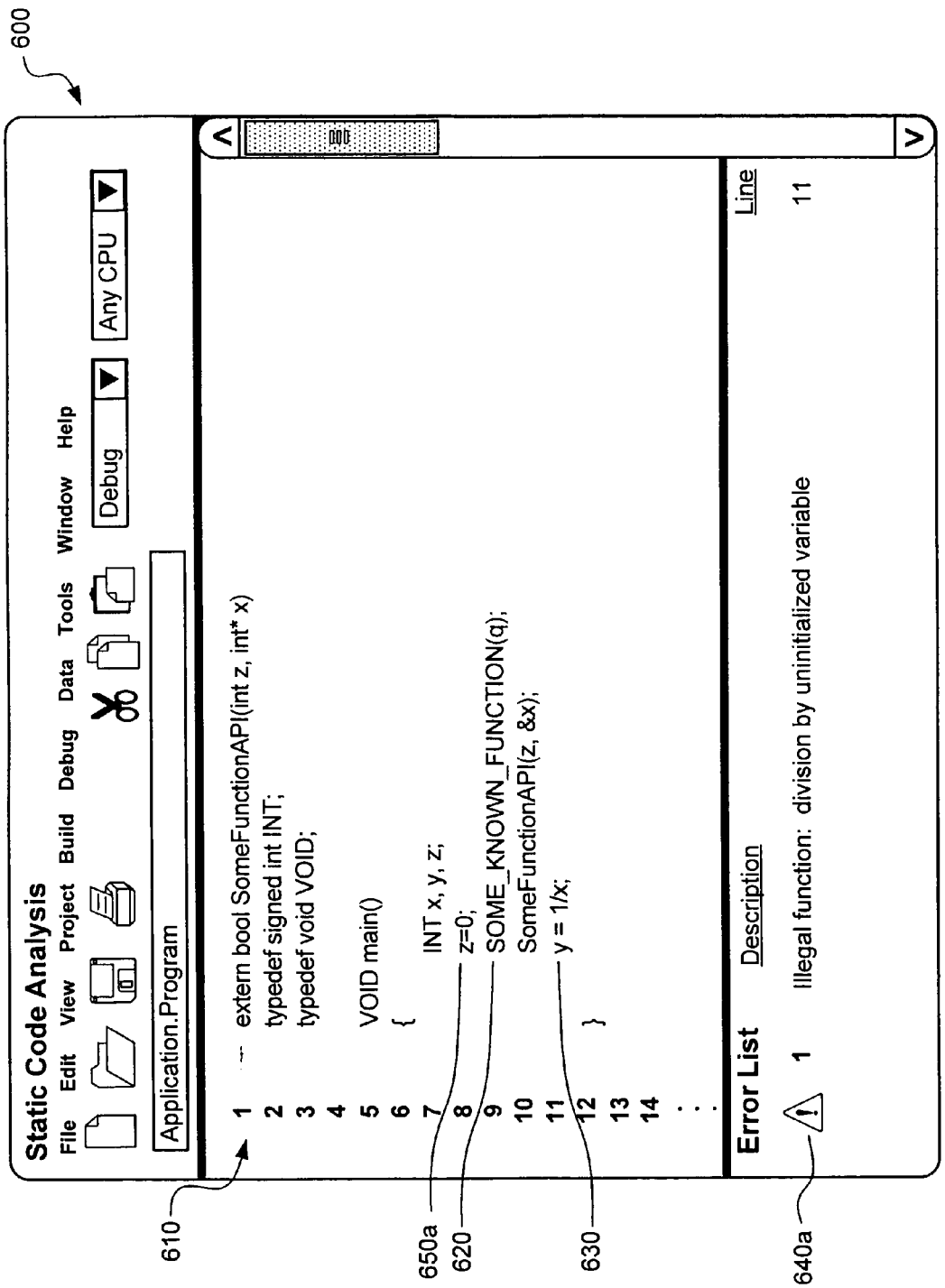
FIGS. 6A and 6B (Prior Art) are screens from a static source code analyzer configured with the assumption that arguments passed to an API are not initialized by the API.

On one hand, a static source code analyzer 600 that does not model the API as shown in FIG. 6A may assume that unless x is initialized by source code 610 as presented—which does not include the API source code—x is not initialized. Thus, regardless of the possibility that API call 620 might initialize x (when z is greater than zero), expression 630, y=1/x at line 11, will result in an error message 640a, because it may result in dividing by an undefined value if x is not initialized. Error message 640a of FIG. 6A, turns out to be an accurate statement because x will not be initialized by the API because variable z is set to zero in expression 650a and, because z is not greater than zero, x will not be initialized. However, error message 640 being accurate is purely fortuitous because a conventional static source code analyzer is not adapted to evaluate the function of the API and, thus, cannot determine whether the API initializes x.

Figure 6B:
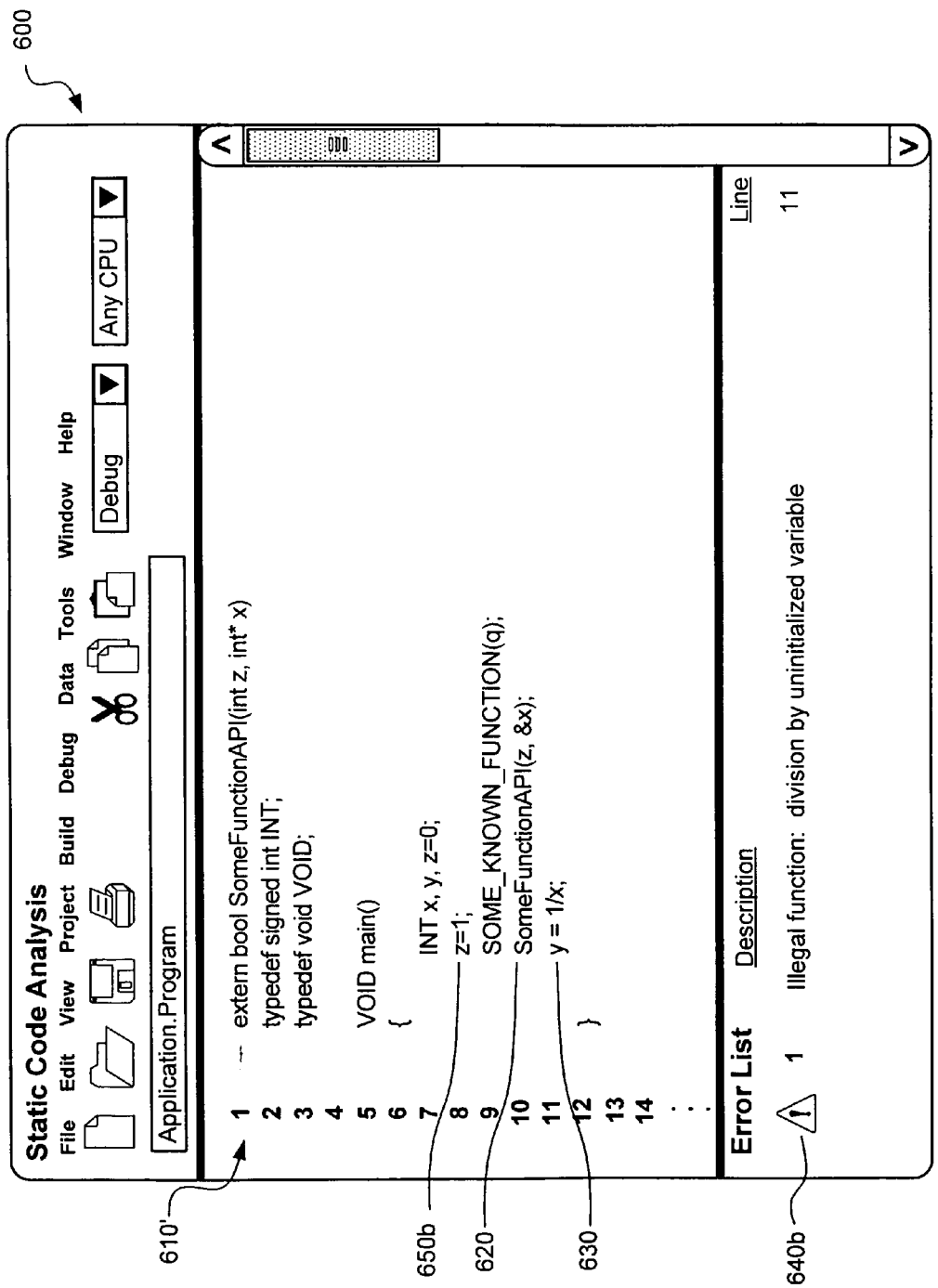

However, without the benefit of an API model, static source code analyzer 600a will generate a similar same error message even when x is initialized, as shown in FIG. 6B. In FIG. 6B, static source code analyzer 600 analyzes source code 610' that is identical to source code 610, except for the change of statement 650a (FIG. 6A), where z was initialized and set equal to zero, to statement 650b preceding an API call 620 that initializes z and sets z equal to one. Accordingly, because z is initialized and greater than zero, as described above, the API will perform a function on x and return x as some nonzero number. Accordingly, expression 630 does not result in division by an uninitialized variable. Nonetheless, error message 640b, indicating the division by uninitialized variable problem is generated, because source code analyzer 600 has no way of determining that statement 650b causes API call 620 to return a value for x that is valid and not zero. Error message 640b constitutes an unequivocally incorrect false positive, because expression 630 will not result in division by an undefined, uninitialized value.

Neither the result of FIG. 6A nor the result of FIG. 6B is acceptable. Error message 640a presents a statement that may not be true, and a software developer may have a difficult task in attempting to debug the code to identify and possibly correct the issue that caused static source code analyzer 600a to generate this message. Error message 640b generated by static source code analyzer also is unacceptable, because it indicates an error where there is none; the software developer cannot possibly revise the code so as to prevent the message; and consequently, the software developer has to ignore error message 640b.

Figure 7A:
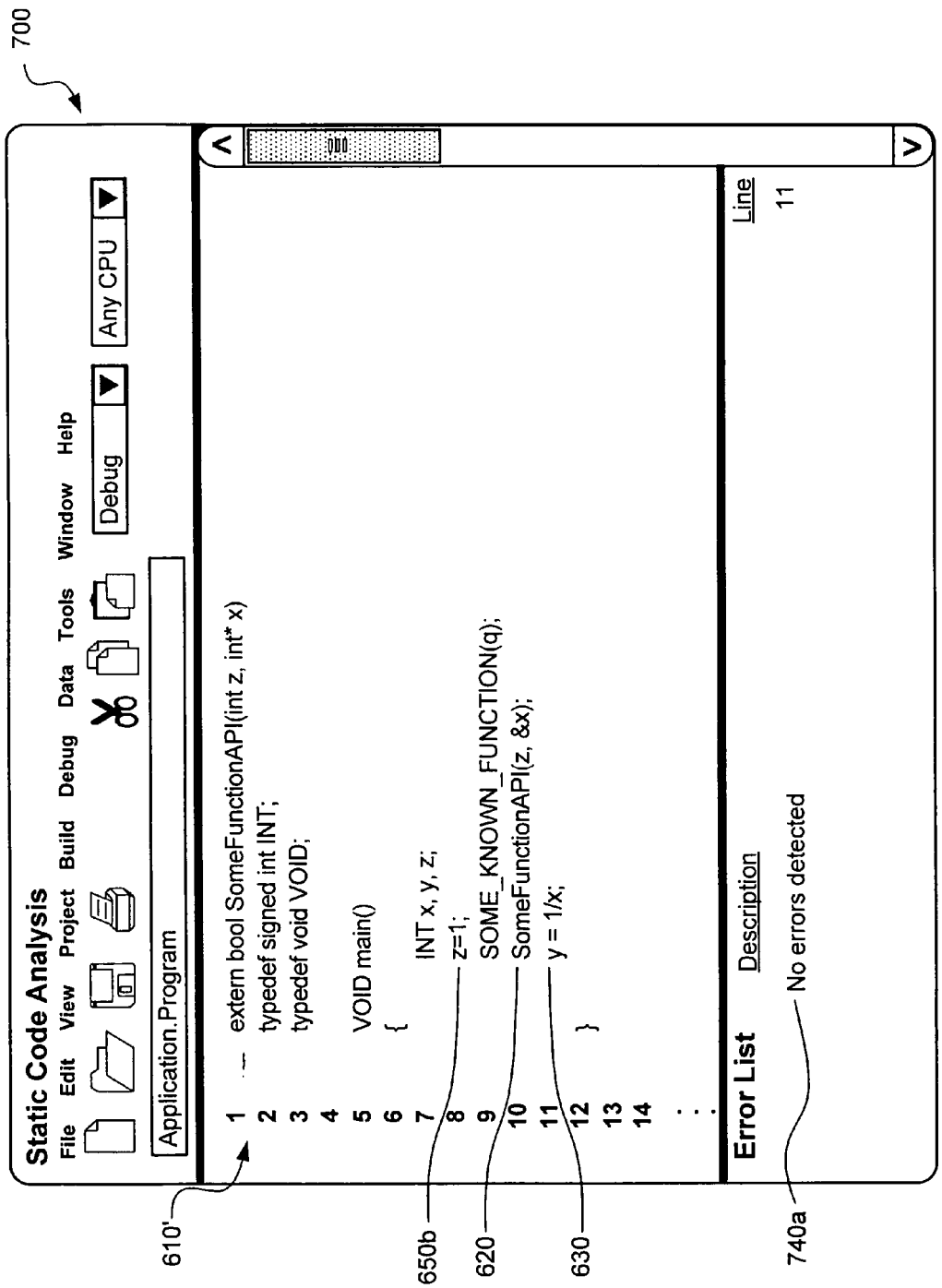
FIGS. 7A and 7B (Prior Art) are screens from a static source code analyzer configured with the assumption that arguments passed to an API are initialized by the API.

Alternatively, as shown in FIG. 7A, a static source code analyzer 700 is configured to operate on the assumption that, in source code 610', arguments passed to an external function, such as those invoked in API call 620, are initialized. In making this assumption, static source code analyzer 700 does not regard expression 630, y=1/x in line 11, as potentially causing an error. Thus, static source code analyzer 700 generates message 740a indicating that no errors have been detected. Fortuitously, message 740a is correct because z was initialized by expression 650b and set equal to one, resulting in the API initializing and returning a nonzero value of x.

Figure 7B:
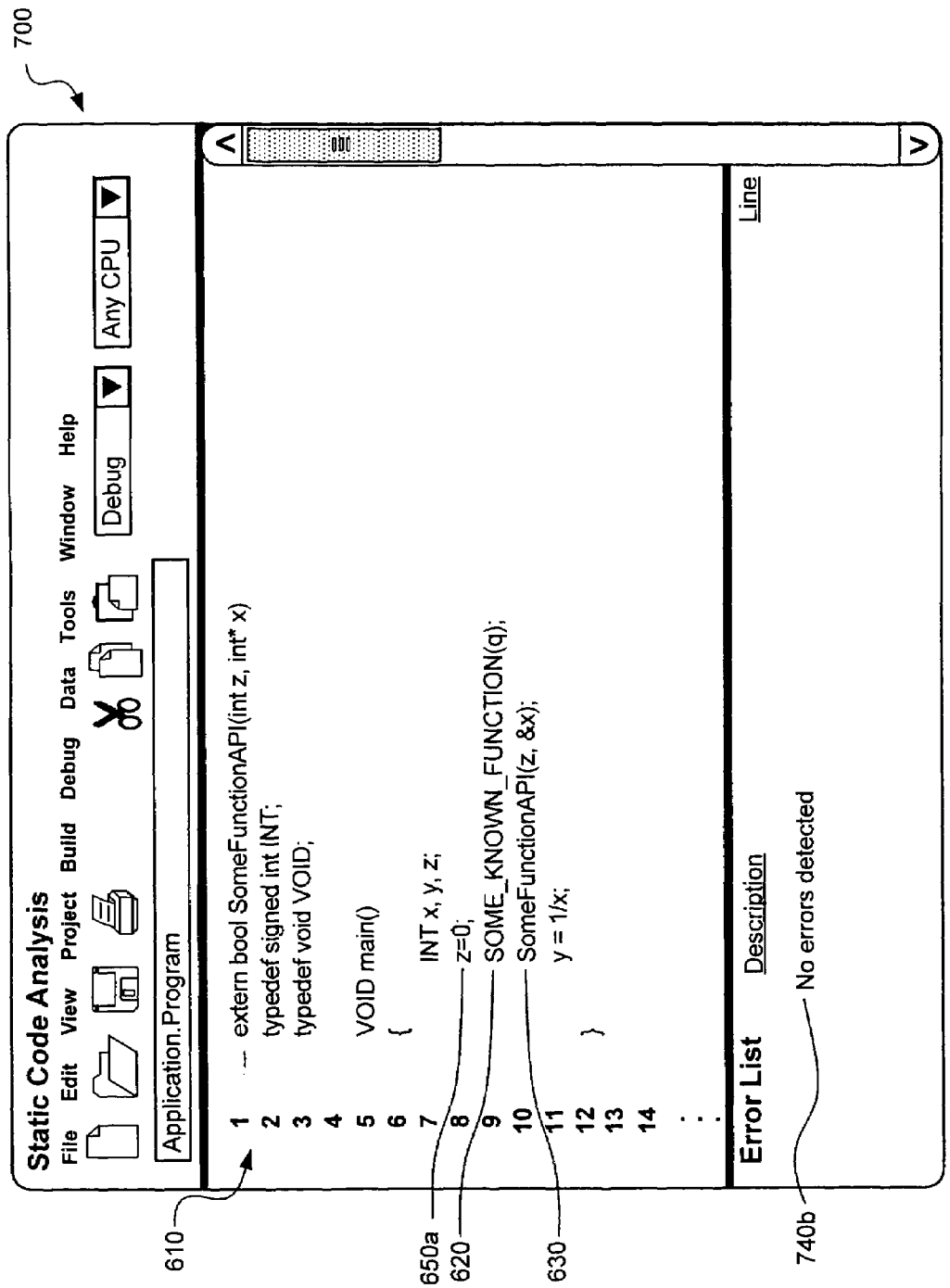

However, without static source code analyzer 700 being configured to analyze the API, this assumption could be wrong. As shown in FIG. 7B, where static source code analyzer 700 analyzes source code 610 in which variable z is initialized and set equal to 0 in statement 650a, the assumption made is wrong. Because z is initialized to zero, in source code 600, API call 620 does not initialize x. Thus, expression 630 results in division by an undefined value. However, message 740b indicates no error has been found. Thus, not being configured to model the API, static source code analyzer again generates message 740b, which is inaccurate. Once again, static source code analyzer 700 generates messages that may be inaccurate false positives, or may fail to include actual errors.

Figure 8A:
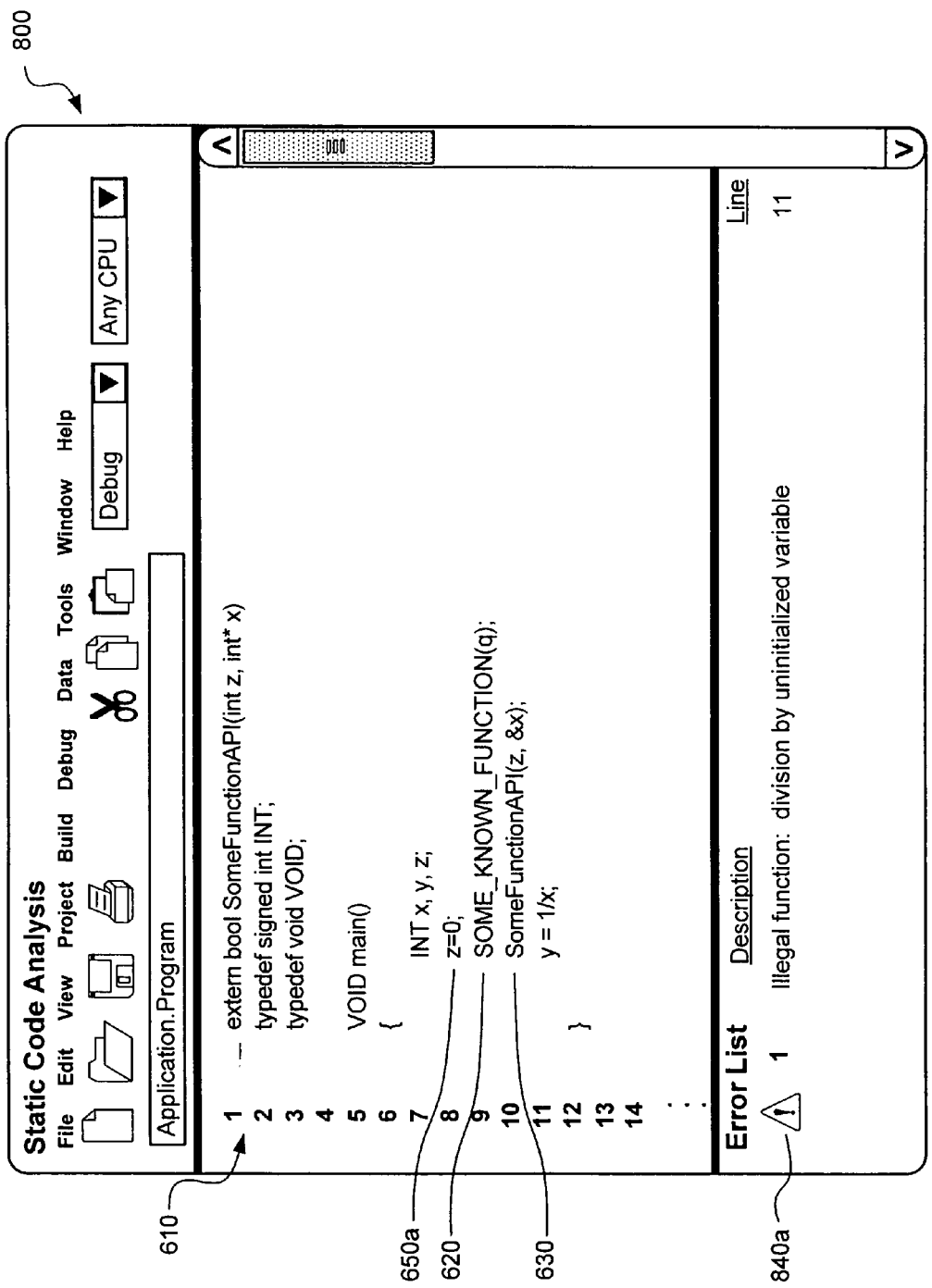
FIGS. 8A and 8B are screens from a static source code analyzer employing an embodiment of the present invention to model functions of the API.

In contrast, using embodiments of the present invention in which a static source code analyzer 800 models the API, the problems described above are avoided. As shown in FIG. 8A, static source code analyzer 800 analyzes source code 610 in which variable z is initialized and set equal to zero by statement 650a As a result, API call 620 results in variable x not being initialized, resulting in division by an undefined value in expression 630. Because static source code analyzer 800 includes a model of the API using API primitives, static source code analyzer correctly models the function of the API, the static source code analyzer recognizes the illegal function and generates an accurate error message 840a.

Figure 8B:
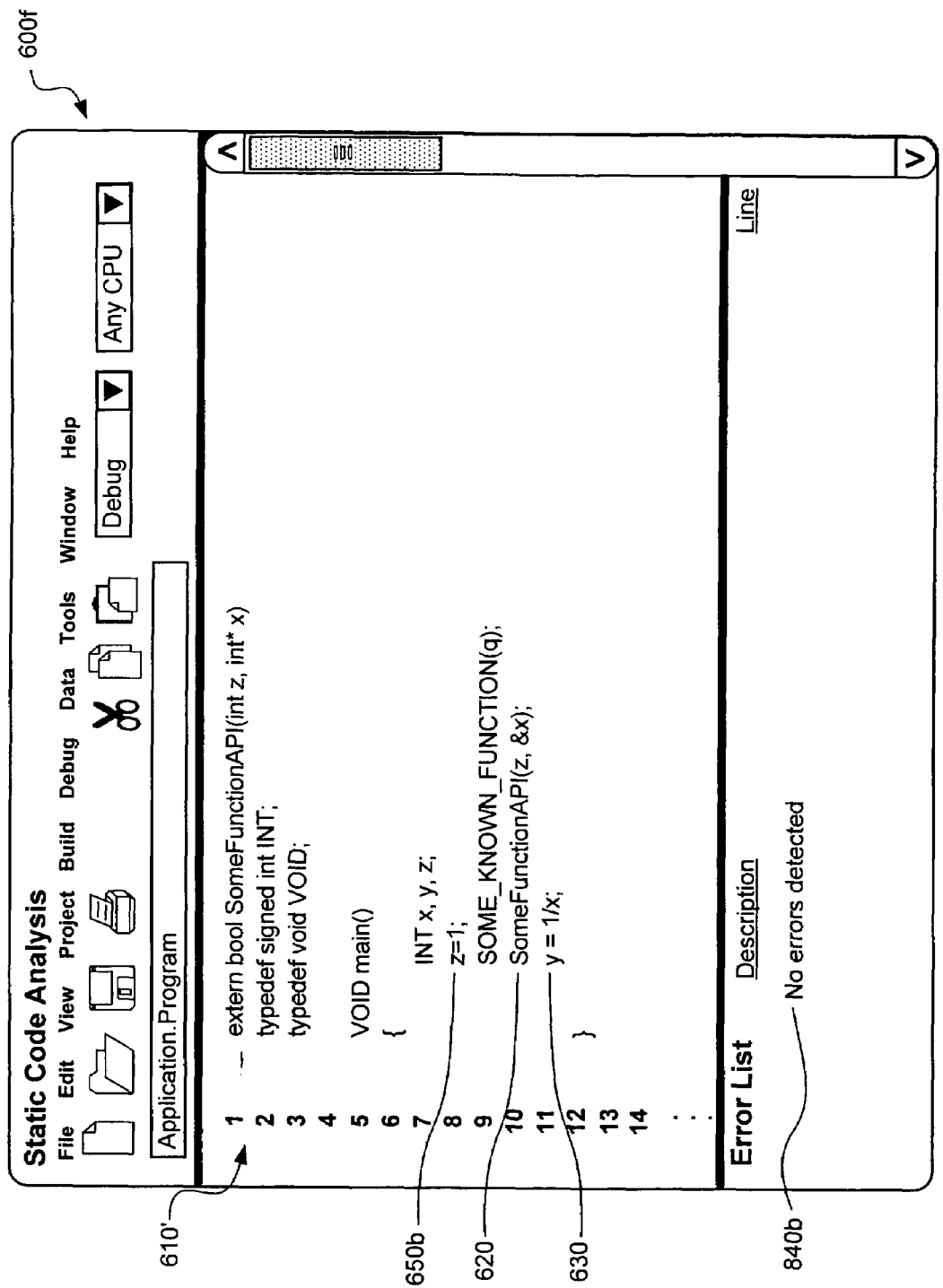

Furthermore, as shown in FIG. 8B, when static source code analyzer 800 analyzes source code 610', which includes expression 650b initializing z to 1 before API call 620, the API will return a non-zero value of x and expression 630 does not represent an illegal operation. Because static source code analyzer 800 models the function of the API using API primitives as previously described, the static source code analyzer correctly determines that initialization of z in expression 650 initializes x and returns a nonzero value, so that it returns a message 840b indicating that no errors were found. Thus, in both the case of source code 610 and 610', static source code analyzer 800 generates an accurate report, which identifies true errors, but does not include false positives.

Process of Static Source Code Analysis Using an API Model

FIG. 9 is a flow diagram 900 illustrating the logical steps for analyzing source code according to an embodiment of the present invention. Analysis starts at a step 902. At a step 904, the source code is received. At a step 906, comments and other non-programming instruction content are masked or otherwise ignored. At a step 908, a source code element is simulated. At a decision step 910, it is determined if the source code element represents a nonstandard element, such as an API call or other external function call. If the element is identified to be a nonstandard element, at a decision step 912, it is determined if the nonstandard element represents an API call. If not, at a step 914, an "unrecognized expression" message is generated. On the other hand, if it is determined at decision step 912 that the nonstandard element is an API call, at a decision step 916, it is determined if an analysis model exists for the API. If not, at a step 918, an error message is generated indicating that no model for the API is available.

On the other hand, if it is determined at decision step 916 that an API model is available, or if it had previously been determined at decision step 910 that the source code element was a standard source code element, at a decision step 920, it is determined if an error is detected in the source code element. If so, an appropriate error message is generated at a step 922. On the other hand, if no error is detected at decision step 920, or once appropriate messages have been generated at steps 914, 908 team, or 922, flow diagram 900 proceeds to a decision step 924. At decision step 924, it is determined if all of the source code elements have been simulated. If not, at a step 926, the next source code element to be evaluated is identified, and the next source code element is evaluated at step 908. Alternatively, once it is determined at decision step 924 that all the source code elements have been simulated, at a step 928, a report is generated including all error messages generated in the preceding steps. Static source code analysis ends at a step 930.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for analyzing invocation of an external function for which function source code implementation is not available, comprising the steps of:
   (a) identifying at least one potential error resulting from improper invocation of the external function by source code calling the external function;
   (b) identifying at least one condition upon invocation of the external function that will result in the potential error;
   (c) creating a model of the external function for which source code is not available to test for the at least one condition that results in the potential error;
   (d) associating the model with a source code analyzer such that when the source code which calls the external function is analyzed by the source code analyzer, the model is applied to evaluate invocation of the external function;
   (e) generating an error message upon finding the at least one condition upon invocation of the external function;
   wherein the model is created using a plurality of primitives usable to test for the at least one condition that results in the potential error; and
   wherein the source code analyzer includes a model repository configured to store the model created, such that the source code analyzer can access the model upon evaluating source code and identifying a reference to the external function.

2. The method of claim 1, wherein the external function includes an application program interface.

3. The method of claim 1, further comprising the step of identifying the at least one condition that will result in the potential error based upon requirements for implementing the external function.

4. The method of claim 1, wherein the at least one condition includes at least one of:
   (a) an incorrect input type of an input parameter acceptable to the application program interface;
   (b) an incorrect input content range of the input parameter acceptable to the application program interface;
   (c) an incorrect output type for an output parameter generatable by the application program interface;
   (d) an incorrect output content range of the output parameter generatable by the application program interface;
   (e) a failure to invoke a prerequisite function that must be invoked prior to invocation of the external function; and
   (f) a failure to invoke a post-requisite function that must be invoked after the invocation of the external function.

5. A memory medium having machine executable instructions stored for carrying out the steps of claim 1.

6. A system for analyzing invocation of an external function for which function source code implementation is not available, the system comprising:
   (a) at least one user input device;
   (b) a display;
   (c) a processor in communication with the input device and the display; and
   (d) a memory in communication with the processor, the memory storing data and machine instructions that cause the processor to carry out a plurality of functions, including:
      (i) deriving rules to evaluate the invocation and operation of any application programming interface (API) signatures;
      (ii) including the derived rules with source code which comprises at least one invocation of an external function for which function source code implementation is not available;
      (iii) identifying at least one potential error resulting from improper invocation of the external function by source code calling the external function;
      (iv) identifying at least one condition upon invocation of the external function that will result in the potential error;
      (v) creating a model of the external function to test for the at least one condition that results in the potential error;
      (vi) associating the model with a source code analyzer such that when the source code which calls the external function is analyzed by the source code analyzer, the model is applied to evaluate invocation of the external function; and
      (vii) generating an error message upon finding the at least one condition upon invocation of the external function;
   wherein the model is created using a plurality of primitives usable to test for the at least one condition that results in the potential error; and
   wherein the source code analyzer includes a model repository configured to store the model created, such that the source code analyzer can access the model upon evaluating source code and identifying a reference to the external function.

7. The system of claim 6, wherein the external function includes an application program interface.

8. The system of claim 6, wherein the machine instructions further cause the processor to identify the at least one condition that will result in the potential error based upon requirements for implementing the external function.

9. The system of claim 6, wherein the at least one condition includes at least one of:
  (a) an incorrect input type of an input parameter acceptable to the application program interface;
  (b) an incorrect input content range of the input parameter acceptable to the application program interface;
  (c) an incorrect output type for an output parameter generatable by the application program interface;
  (d) an incorrect output content range of the output parameter generatable by the application program interface;
  (e) a failure to invoke a prerequisite function that must be invoked prior to invocation of the external function; and
  (f) a failure to invoke a post-requisite function that must be invoked after the invocation of the external function.

\* \* \* \* \*